United States Patent [19]

Frankel

[11] Patent Number: 5,423,215

[45] Date of Patent: Jun. 13, 1995

[54] SELF-CONTAINED HEADS-UP VISUAL ALTIMETER FOR SKYDIVING

[76] Inventor: Ronald A. Frankel, Porcine Parachuting Products, P.O. Box 986, College Park, Md. 20741-0986

[21] Appl. No.: 223,733

[22] Filed: Apr. 6, 1994

[51] Int. Cl.⁶ ............................................. G01L 7/12
[52] U.S. Cl. ...................................... 73/386; 340/980; 244/147
[58] Field of Search ................. 73/384, 386, 300, 387; 116/266, 268, 276; 244/147, 149, 150; 340/525, 600, 611, 980; 351/154, 158

[56] References Cited

U.S. PATENT DOCUMENTS

| | | | |
|---|---|---|---|
| 4,292,671 | 9/1981 | Evans et al. | 364/433 |
| 4,315,241 | 2/1982 | Spooner | 340/980 |
| 4,319,487 | 3/1982 | Hasse et al. | 73/384 |
| 4,495,483 | 1/1985 | Bateman | 340/970 |
| 4,507,962 | 4/1985 | Hitt et al. | 73/384 |
| 4,539,843 | 9/1985 | Wise | 73/179 |
| 4,554,545 | 11/1985 | Lowe | 340/980 |
| 4,602,248 | 7/1986 | Foster et al. | 340/601 |
| 4,694,694 | 9/1987 | Vlakancic et al. | 73/386 |
| 4,724,707 | 2/1988 | Innerhoffer | 73/384 |
| 4,858,856 | 8/1989 | Cloth | 244/149 |
| 4,868,916 | 9/1989 | Ablov et al. | 340/970 |
| 4,916,448 | 4/1990 | Thor | 340/970 |
| 4,969,858 | 11/1990 | Peet, II | 73/384 |
| 5,001,929 | 3/1991 | Peet, II | 73/384 |
| 5,033,818 | 7/1991 | Barr | 351/158 |

*Primary Examiner*—Herbert Goldstein
*Assistant Examiner*—William L. Oen

[57] ABSTRACT

A compact altitude and rate of descent instrument is combined with a visual indication device and attached directly as a self-contained unit to protective eye wear or headgear for the determination of critical altitudes while engaged in freefall skydiving without the need for head or hand movements. Such an instrument reduces potentially fatal lack of altitude awareness due to extraneous factors and allows for more complete concentration on maintaining eye contact with others when performing maneuvers in close proximity such as during freefall formation flying (relative work).

3 Claims, 8 Drawing Sheets

SELF-CONTAINED HEADS-UP VISUAL ALTIMETER FOR SKYDIVING

FIELD OF INVENTION

The present invention relates to the visual determination of specific critical altitudes during sport skydiving and also for specialized military uses of freefall (vs. static line) parachuting, e.g. Special Forces HALO (High Altitude Low Opening) jumps, demonstration jumps, and night operations.

BACKGROUND INFORMATION

During freefall skydiving, the determination of one's altitude above the local terrain (above ground level or AGL) is of primary importance in order to deploy a main parachute at a sufficiently high altitude to allow for a safe cutaway, or jettisoning of the main parachute, and full reserve deployment in case of a main parachute malfunction, During what is known as relative work or formation flying, where anywhere from two to two hundred people may be flying in close proximity, it is of equal importance to know when to cease flying in information in order to have time to gain safe horizontal separation from one another before deploying a parachute. Precise altitude information is usually provided by a mechanical dial-face altimeter, worn on the chest or back of hand. However, it is impractical and dangerous to continuously monitor one's altimeter in flight, due to the need to constantly maintain awareness of the locations and sometimes hazardous flight trajectories of those around you in order to avoid potentially fatal freefall collisions. For experienced competition teams of, for example, eight people, the collision hazard is small, but the concentration is on maintaining eye contact in order to fly "relative" and perform different maneuvers, taking and releasing handholds ("grips") on your teammates' arms or legs, a process known as turning points. To turn the maximum number of points is the goal, and the better the level of eye contact, the more points can be turned. This is at odds with the need to glance at a chest-mounted or wrist-mounted altimeter or even the ground; intense concentration on the turning of points can cause loss of time and altitude awareness. The only solution until now is the use of an audible alert, which may be used but which has disadvantages as outlined below.

DESCRIPTION OF THE PRIOR ART

Present means to visually determine one's altitude involve the shifting of one's eyes, head, hand, or arm, or any combination thereof, to view an altimeter worn typically on the chest, wrist, or back of hand. The movement required to view these altimeters has undesired consequences affecting flying ability and loss of concentration on formation flying. One may also attempt to visually judge one's altitude based on one's visual perception of ground feature size, but this requires experience and varies greatly from person to person. The accuracy of such visual altitude judging is also dependent on the density and type of local terrain features and also on weather, cloud, and lighting conditions.

Use of an audible altimeter addresses the above limitations but may carry penalties such as: the requirement to wear headgear; decrease in ability to hear important aural directions while preparing to jump; an audible and potentially ear-damaging distraction during freefall; reliance on electro-mechanical mechanisms subject to failure, and; additional discomfort from the wearing of such a device.

That use of heads-up visual indication of information during relative work or other freefall operations which may exist today is limited to the attachment of devices to sighting devices, used only by freefall photographers, and requiring the use of protective headgear with said sighting device attached thereon, and conveying information relating to altitude, operational status of helmet-mounted cameras, or other pertinent information, and presently under manufacture and sale by myself and others, and not under manufacture by anyone at the time of original application filing, and for which no applicable patents have been found.

SUMMARY OF INVENTION

The present invention is an instrument which is an improvement over existing visual altimeters used during freefall. Recent advances in electronic technology allow the reduction in size and weight of a complete power, altitude sensing, amplification, computing, visual display, and packaging system to the point whereby said system may be attached as a self-contained unit to protective eye wear or headgear without being obtrusive to the user. Said invention allows experienced skydivers who may wish to jump without a helmet the ability to visually determine critical altitudes without breaking eye contact with others.

DESCRIPTION OF THE PREFERRED EMBODIMENTS

Figure 1:
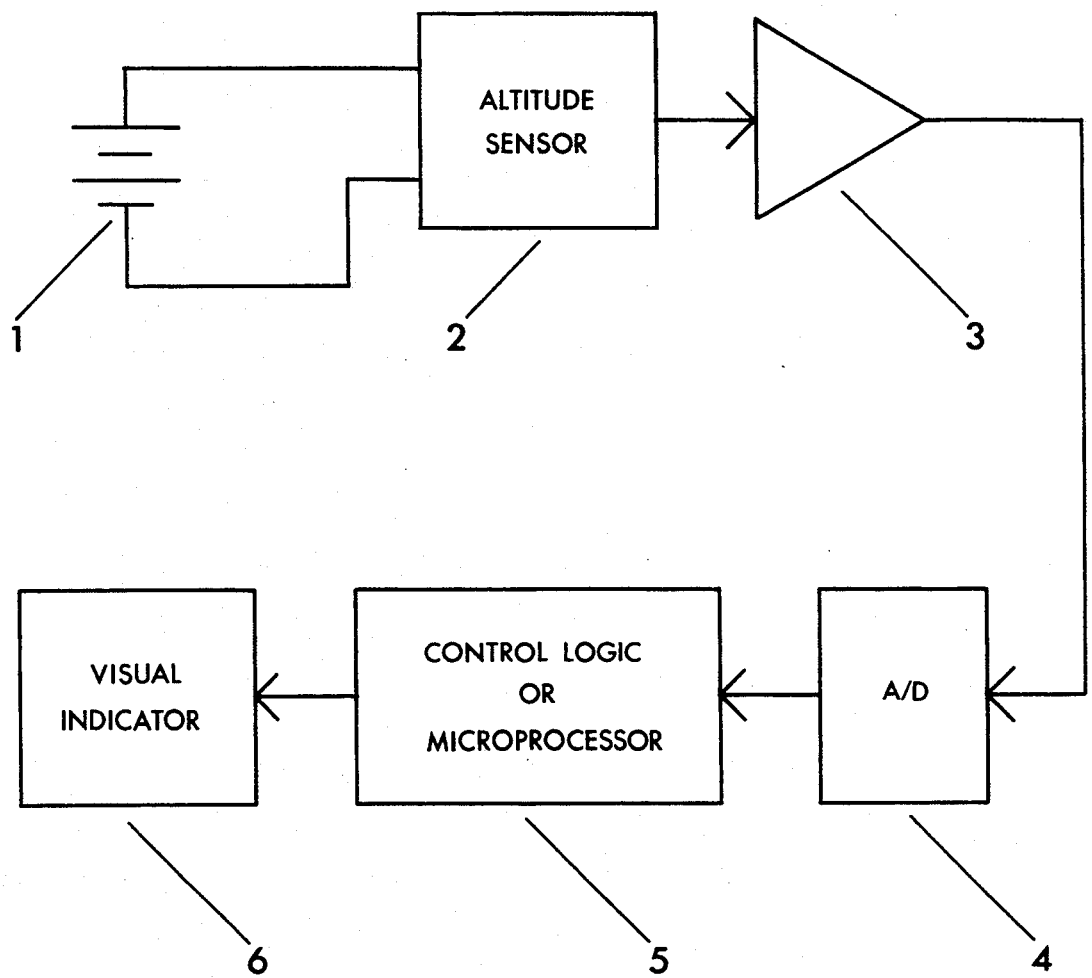
FIG. 1 is an electrical block diagram of the circuit.

In FIG. 1 is shown the basic operation of the invention. Electrical power from a battery or batteries 1 is applied to a barometric pressure sensor 2, which varies the electrical power passing through it to produce an electrical signal based on changes in air pressure. Said electrical output is amplified by amplifier 3, converted from analog to digital form by A/D converter 4, and used as input by control circuit 5. The A/D converter 4 may be integral to the control circuit, as in the presently preferred embodiments, and its presence is implied in exploded view depiction FIG. 2. The A/D converter 4 is not essential to construct the present invention, and completely analog means may be employed to construct the circuit, in which case the output from amplifier 3 passes directly into control circuit 5. Furthermore, an extremely sensitive control circuit may be employed to construct the present invention, thereby eliminating the need for amplifier 3, in which case the output from barometric pressure sensor 2 passes directly into control circuit 5. Based upon measured barometric pressure, and dependent on such software instructions or hardware wiring as may exist, said control circuit outputs appropriate signals to the visual display device 6.

Figure 2:
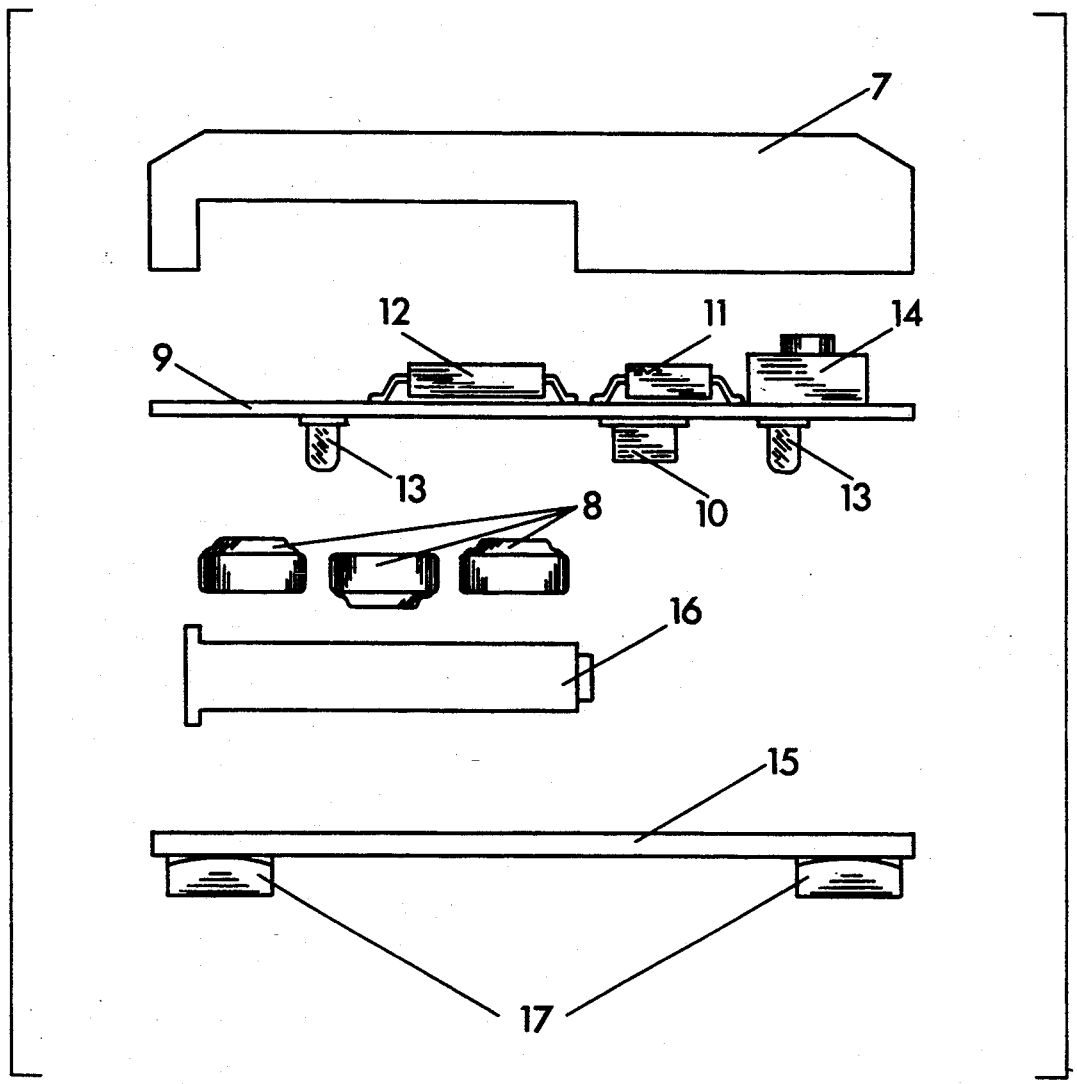
FIG. 2 is an exploded view depiction of a first presently preferred embodiment of the heads-up altimeter.

In FIG. 2 is shown an exploded view of a first presently preferred embodiment. Case 7 contains all components, including batteries 8, and printed circuit board 9, on which are mounted barometric pressure sensor 10, amplifier 11, control circuit with integral A/D converter 12, and L.E.D.s 13. Switch 14 is used for power-on and zeroing; power off is automatic after a predetermined number of hours. Cover 15 and battery cover 16 protect the circuitry and complete the case. Spring clips 17 attach the instrument to the protective goggles or eye wear.

Figure 3:
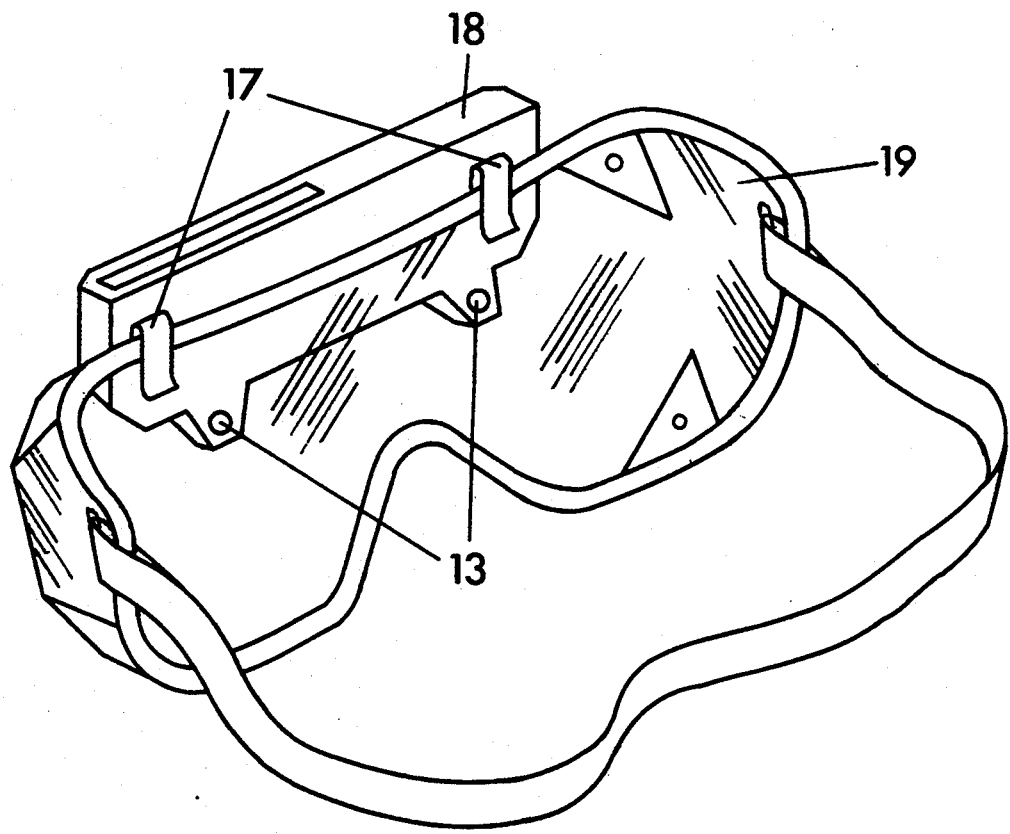
FIG. 3 is a depiction of the first presently preferred embodiment from the previous figure affixed to goggles.

In FIG. 3 is shown a depiction of the fully assembled first presently preferred embodiment 18 from the previous figure attached by means of the spring clips 17 to a representative pair of protective goggles 19. The two L.E.D.s 13 are positioned in the top center of the field of view of each eye, shining directly into the eye for maximum intensity when jumping in bright sunlight. It is to be understood that standard eyeglasses, ski goggles, sunglasses, or other protective eye wear may be used instead of or in addition to goggles (large goggles may be worn over glasses). It is also to be understood that the present invention may be attached to protective headgear such as a hard helmet.

Figure 4:
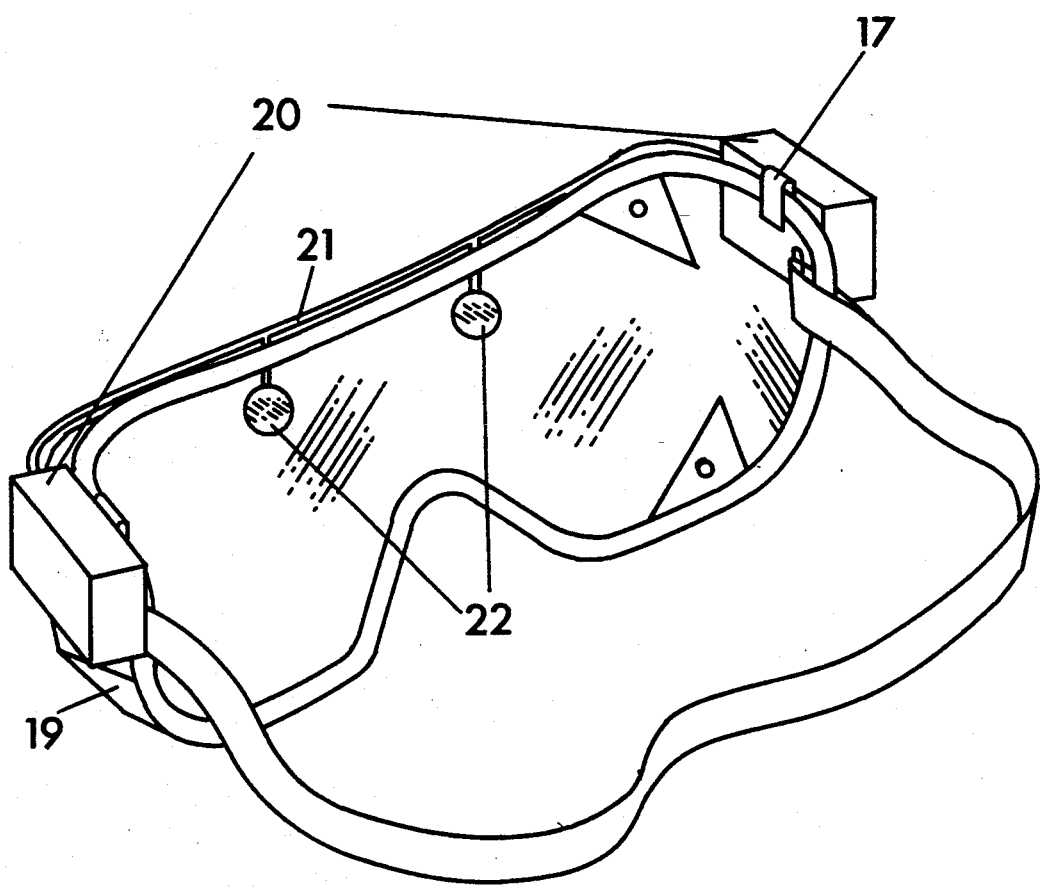
FIG. 4 is a depiction of a second presently preferred embodiment of the heads-up altimeter affixed to goggles.

In FIG. 4 is shown a depiction of a second presently preferred embodiment affixed to goggles. The single case from FIG. 3 is replaced with a split case, typically with the batteries in one of the two case sections 20 and the electronics in the other. The case sections attach to the goggles with spring clips 17. A wire for circuit power and visual indicator current 21 connects the two case sections, with the visual indication devices 22 suspended from the wire and either rigid enough to stay in place unaided or held to the goggles with epoxy or tape or other means of attachment. The visual indication devices shown here as an example are each single-element Liquid Crystal Display (L.C.D.) segments which are clear when off, black when on; however, the L.E.D.s 13 from FIG. 2 and FIG. 3 could be used, as could virtually any small incandescent or xenon lamp, strobe tube, diode, or other visual indication device.

Figure 5:
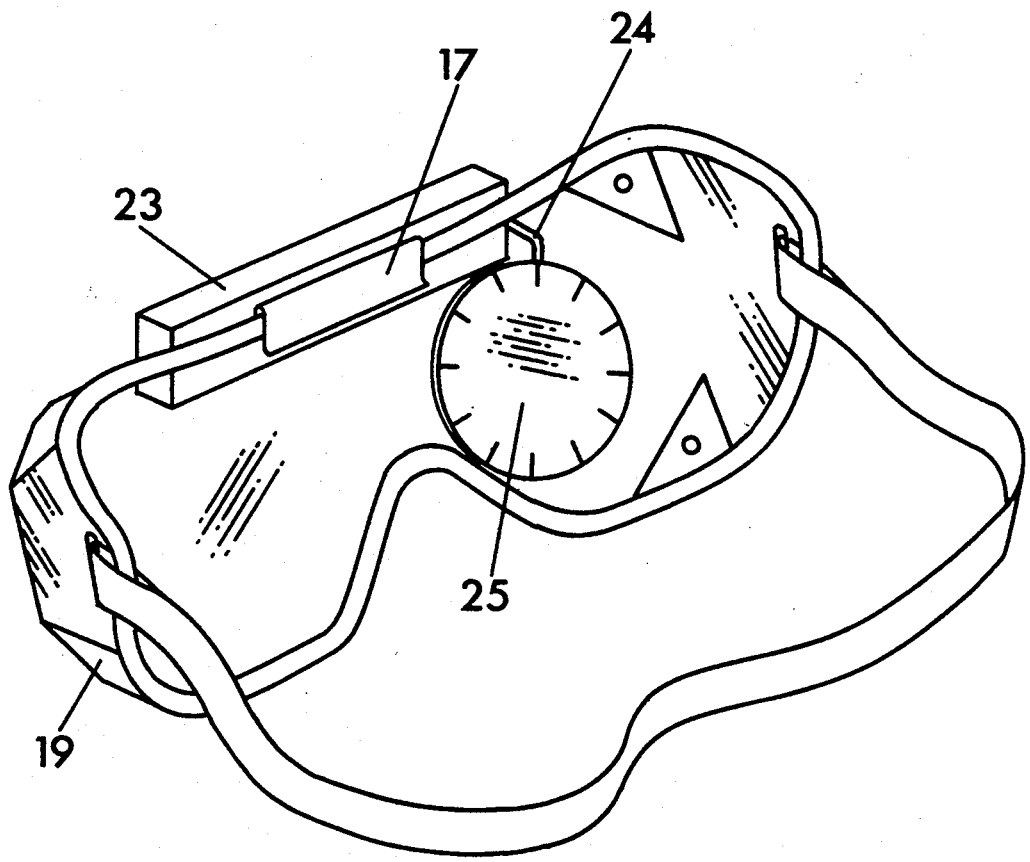
FIG. 5 is a depiction of a third presently preferred embodiment of the heads-up altimeter affixed to goggles.

In FIG. 5 is shown a depiction of a third presently preferred embodiment affixed to goggles. A single case 23 containing batteries and electronics is affixed by spring clip 17 to the goggles 19. A wire 24 connects the electronics to a single large multi-element L.C.D. display 25, which is affixed to the goggles or glasses with epoxy or tape or other means. The display shown here would present a clockface display, with elements turning on or off as the user descends.

Figure 6:
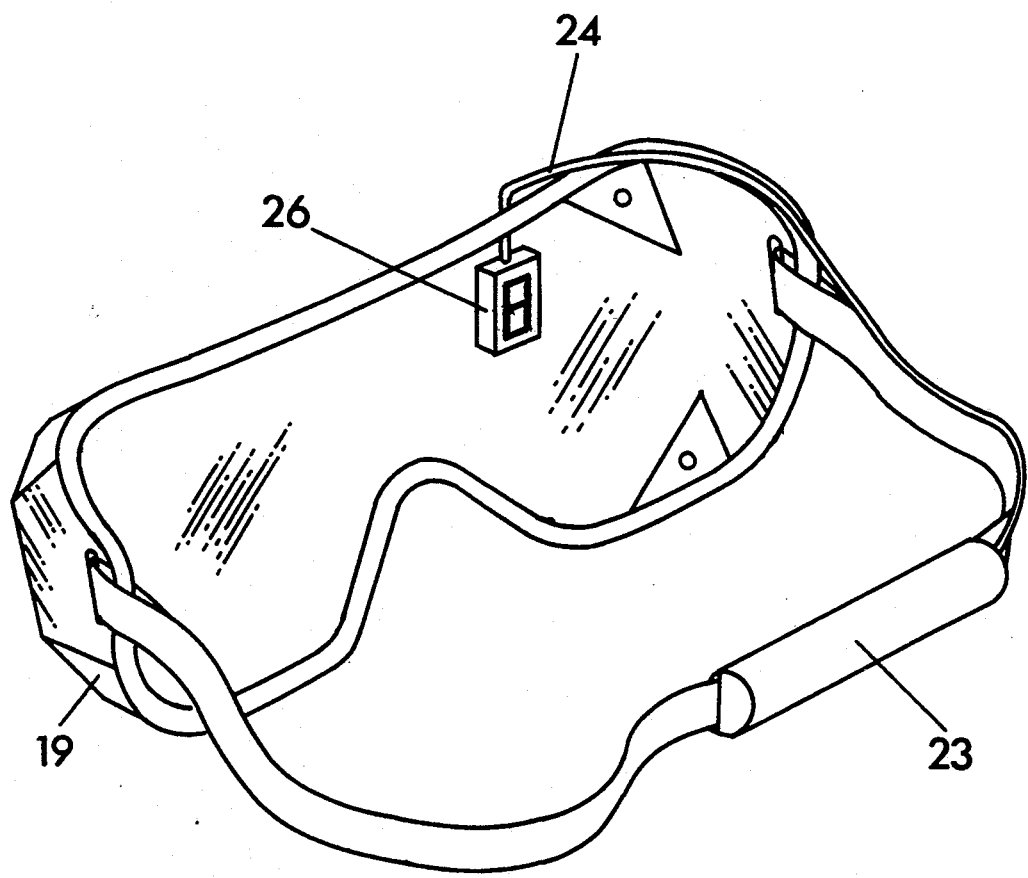
FIG. 6 is a depiction of a fourth presently preferred embodiment of the heads-up altimeter affixed to goggles.

In FIG. 6 is shown a depiction of a fourth presently preferred embodiment affixed to goggles. The single case 23 is attached to the restraining strap of the goggles 19 with a clip or other fastening means, with the wire 24 connecting the case to the visual indication device 26, in this depiction a seven-segment L.E.D. display affixed to the goggles with epoxy or transparent tape.

Figure 7:
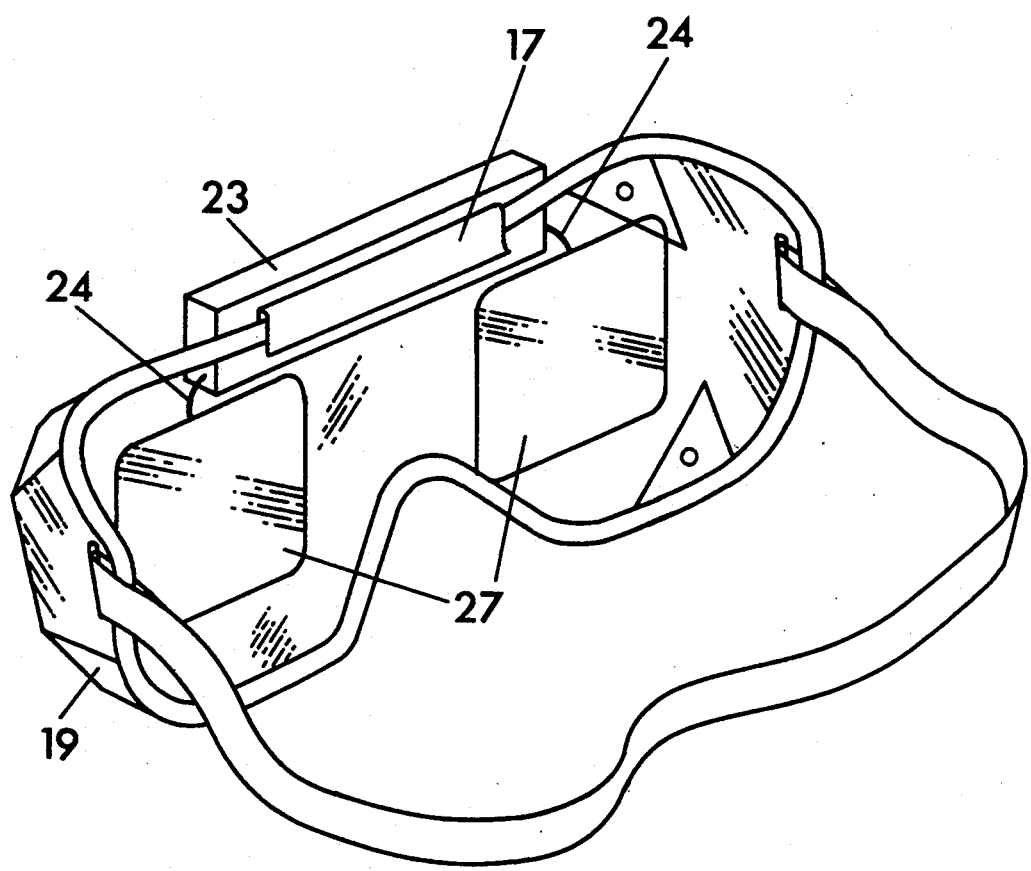
FIG. 7 is a depiction of a fifth presently preferred embodiment of the heads-up altimeter affixed to goggles.

In FIG. 7 is shown a depiction of a fifth presently preferred embodiment affixed to goggles. The single case 23 is attached by means of a spring clip 17 to the goggles 19. Two wires 24 connect the case to two pieces of electrically sensitive film 27, which change color as current is applied. The film is attached to the goggles with adhesive which may be incorporated as part of the film.

Figure 8:
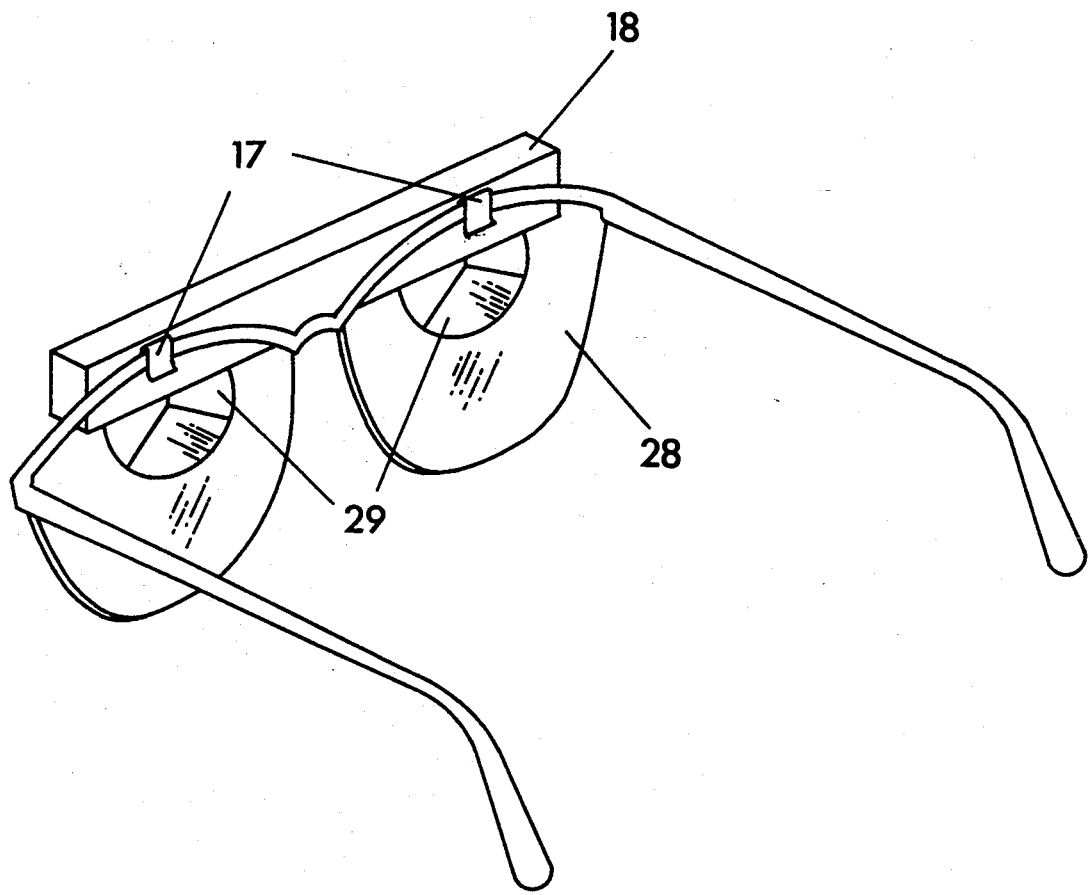
FIG. 8 is a depiction of a sixth presently preferred embodiment of the heads-up altimeter affixed to standard eyeglasses.

In FIG. 8 is shown a depiction of a sixth presently preferred embodiment affixed to standard eyeglasses. The single case containing all elements of the heads-up altimeter 18 is attached to the glasses 28 by means of spring clips 17. The visual indication devices 29 are glass or plastic disks which are rotated to position a different colored portion in front of each eye as altitude decreases (e.g. green, then yellow, then red). The disks are driven by means of tiny motors such as those used in camera lenses.

It thus will be seen that the instrument set forth above can be constructed to achieve a derivation of benefits as discussed in the description of the prior art, and that said instrument is new and represents an improvement over the prior art.

It is to be understood that such descriptions and depictions of the preferred embodiments as are contained above are not intended to limit such construction of this device to those particular visual indication devices, or those particular means of attachment, or those particular constructs of case as may be described or depicted, but are intended to give representative configurations, and that such devices as may be constructed could incorporate other means of conveying visual information, and that such patent as may be secured under the descriptions and claims herein made shall cover such alternative means of altitude determination, or of information conveyance, or of packaging, or of mounting, or of details of operation as may be described above.

What is claimed and desired to be secured by Letters Patent is:

1. A self-contained instrument for skydivers for the heads-up visual determination of critical altitude data, comprising;

a barometric pressure sensor for measuring air pressure producing a first electrical signal;

an amplifier for amplifying said first electrical signal to produce a second electrical signal;

an A/D converter to convert said second electrical signal frown analog to digital form to produce a third electrical signal;

circuitry means to convert said third electrical signal into output signals for the control of a visual indication device;

a visual indication device to convert said output signals from said circuitry means into visual information for the user;

a battery power source for supplying electrical energy to said barometric pressure sensor, said amplifier, said A/D converter, said circuitry means for visual indication device control, and said visual indication device;

means to contain all components of said instrument, and;

means to attach said instrument to protective eye wear or headgear.

2. A self-contained instrument for skydivers for the heads-up visual determination of critical altitude data, comprising:

a barometric pressure sensor for measuring air pressure producing a first electrical signal;

an amplifier for amplifying said first electrical signal to produce a second electrical signal;

circuitry means to convert said second electrical signal into output signals for the control of a visual indication device:

a visual indication device to convert said output signals from said circuitry means into visual information for the user;

a battery power source for supplying electrical energy to said barometric pressure sensor, said amplifier, said circuitry means for visual indication device control, and said visual indication device:

means to contain all components of said instrument, and;

means to attach said instrument to protective eye wear or headgear.

3. A self-contained instrument for skydivers for the heads-up visual determination of critical altitude data, comprising:

a barometric pressure sensor for measuring air pressure producing an electrical signal;

circuitry means to convert said electrical signal into output signals for the control of a visual indication device;

a visual indication device to convert said output signals from said circuitry means into visual information for the user;

a battery power source for supplying electrical energy to said barometric pressure sensor, said circuitry means for visual indication device control, and said visual indication device;

means to contain all components of said instrument, and;

means to attach said instrument to protective eye wear or headgear.

* * * * *